(12) United States Patent
Schäfer et al.

(10) Patent No.: US 8,026,809 B2
(45) Date of Patent: Sep. 27, 2011

(54) MONITORING METHOD AND STATIONARY UNIT FOR A MOTOR-DRIVEN DOOR

(75) Inventors: Dirk Schäfer, Weilmünster (DE); Frieder Heinze, Hüttenberg (DE)

(73) Assignee: Feig Electronic GmbH, Weilburg-Waldhausen (DE)

( * ) Notice: Subject to any disclaimer, the term of this patent is extended or adjusted under 35 U.S.C. 154(b) by 446 days.

(21) Appl. No.: 12/052,491

(22) Filed: Mar. 20, 2008

(65) Prior Publication Data
US 2008/0231442 A1    Sep. 25, 2008

(30) Foreign Application Priority Data

Mar. 23, 2007  (DE) .......................... 10 2007 014 626
Mar. 23, 2007  (DE) .......................... 10 2007 014 627
Jul. 5, 2007    (EP) ..................................... 07111823
Mar. 7, 2008    (EP) ..................................... 08102370

(51) Int. Cl.
*G08B 21/00* (2006.01)
(52) U.S. Cl. .............. 340/540; 340/545.5; 340/545.6; 340/545.7; 340/545.8; 340/660; 340/661; 340/662; 340/663; 340/664
(58) Field of Classification Search .......... 340/540, 340/10.33–10.34, 660–664, 683, 545.5–545.8; 318/282
See application file for complete search history.

(56) References Cited

U.S. PATENT DOCUMENTS

| | | | |
|---|---|---|---|
| 4,027,276 A | 5/1977 | Shaughnessy | |
| 5,412,297 A | 5/1995 | Clark | |
| 6,346,889 B1 * | 2/2002 | Moss | ......................... 340/686.1 |
| 7,123,144 B2 | 10/2006 | Anderson et al. | |
| 2002/0183008 A1 | 12/2002 | Menard et al. | |
| 2004/0077383 A1 | 4/2004 | Lappetelainen et al. | |
| 2005/0017663 A1 | 1/2005 | Anderson | |
| 2005/0118954 A1 | 6/2005 | Nielsen et al. | |
| 2005/0253710 A1 * | 11/2005 | Eskildsen | .................. 340/545.5 |
| 2006/0028157 A1 | 2/2006 | Ying | |

(Continued)

FOREIGN PATENT DOCUMENTS

DE    43 13 062 C2    2/1996
(Continued)

OTHER PUBLICATIONS

IEEE Standard for Information Technology—Telecommunications and information exchange between systems—local and metropolitan area networks—specific requirements, Part 11: Wireless LAN Medium Access Control (MAC) and Physical Layer (PHY) Specifications; IEEE Std. 802.11™—2007, Jun. 12, 2007.

(Continued)

*Primary Examiner* — George Bugg
*Assistant Examiner* — Ojiako Nwugo
(74) *Attorney, Agent, or Firm* — Smith Gambrell & Russell LLP (57) ABSTRACT

A monitoring method and a monitoring device for a motor-driven door, wherein a stationary unit and a monitoring device mounted on the movable door communicate bidirectionally with one another, wherein data and/or signals of at least one door safety sensor are relayed to the stationary unit, and wherein a waking device is automatically wakened cyclically or is wakened by a vibration sensor and wakes the control device, which in turn wakes the transmitter/receiver and actively queries the stationary unit assigned individually to it as to whether the monitoring device must remain active or be switched back to a power-saving idle state.

13 Claims, 5 Drawing Sheets

U.S. PATENT DOCUMENTS

| | | |
|---|---|---|
| 2006/0109079 A1 | 5/2006 | Mack |
| 2006/0188004 A1 | 8/2006 | Kizu et al. |
| 2006/0240772 A1* | 10/2006 | Schoening et al. ............. 455/39 |
| 2007/0080824 A1* | 4/2007 | Chen et al. ............... 340/825.49 |
| 2008/0231441 A1 | 9/2008 | Schafer |
| 2008/0315988 A1 | 12/2008 | Sikora |
| 2009/0036057 A1 | 2/2009 | Nielsen et al. |

FOREIGN PATENT DOCUMENTS

| | | |
|---|---|---|
| DE | 43 13 063 C2 | 2/1996 |
| DE | 296 06 569 U1 | 9/1997 |
| DE | 296 23 251 U1 | 11/1998 |
| DE | 100 00 641 C1 | 1/2000 |
| DE | 103 02 812 A1 | 8/2004 |
| EP | 1 722 339 A1 | 5/2005 |
| EP | 1 686 699 A2 | 8/2006 |
| EP | 2107691 A1 | 10/2009 |
| WO | WO 03/056530 | 7/2003 |

OTHER PUBLICATIONS

IEEE Standard for Information Technology—Telecommunications and information exchange between systems—local and metropolitan area networks—specific requirements, Part 15.1: Wireless medium access control (MAC) and physical layer (PHY) specifications for wireless personal area networks (WPANs); IEEE Computer Society, Jun. 14, 2005.

IEEE Standard for Information Technology—Telecommunications and information exchange between systems—local and metropolitan area networks—specific requirements, Part 15.4: Wireless medium access control (MAC) and Physical Layer (PHY) Specifications for Low-Rate Wireless Personal Area Networks (WPANS), IEEE Computer Society; IEEE Std. 802.15.4™-2006, Sep. 8, 2006.

European Search Report issued on Mar. 10, 2008 for copending European application No. EP 07/110894.8.

The European Search Report dated Feb. 2, 2008.

* cited by examiner

MONITORING METHOD AND STATIONARY UNIT FOR A MOTOR-DRIVEN DOOR

CROSS-REFERENCE TO RELATED APPLICATIONS

This patent application is based on and claims convention priority under 35 USC Section 119 on German patent application no. DE 10 2007 014 626.6 filed on 23 Mar. 2007, German patent application no DE 10 2007 014 627.4 filed on 23 Mar. 2007, European patent application no. EP 07/111,823.6 filed on 5 Jul. 2007, and European patent application no. EP 08/102,370.7 filed on 7 Mar. 2008, each of which is incorporated herein in its entirety.

BACKGROUND OF THE INVENTION

The invention relates to a monitoring method and a stationary unit for a motor-driven door. In this connection the term door will be understood as any means with which a building or a site can be closed, and it includes, for example, sliding doors, rolling doors, sectional doors or swinging doors.

In particular, the invention relates to a method implemented by a battery-powered monitoring device mounted on the door leaf or door curtain, which device is intended for wireless data exchange via a bidirectional radio link with a stationary unit, and to a method for fail-safe and power-saving operation of the monitoring device.

From the prior art (DE 10302812 A1) there is known a monitoring device and a monitoring method for a motor-driven building closure, especially a door. This prior art door is equipped with a motor-drive group for driving a movable door wing and with a controlling device for control and monitoring of the movement of the wing. The controlling device comprises a first fixed electrotechnical unit and a second movable electrotechnical unit, which is mounted to ride on the wing and which can communicate with the fixed unit. A riding transmitter-receiver is provided on the wing next to the riding unit and a fixed transmitter-receiver is provided next to the fixed unit, whereby the two transmitter-receivers permit the two units to communicate wirelessly with one another. In this prior art door, the transmitter-receiver is capable of pulsed operation and the riding transmitter-receiver as well as the riding unit can be switched from a power-saving waiting state to an operating state. The riding transmitter-receiver is automatically controllable, in the sense that it repeatedly switches from a waiting state to the operating state and back to the waiting state, if during the operating state it has not detected an activating, uncoded signal from an optional fixed unit in the form of sufficiently high field strength.

This prior art device has the disadvantage that a plurality of doors cannot be operated simultaneously with this door controller. The transmitter-receiver of a first door switches automatically to an operating state. If it receives a signal with sufficiently high field strength, it remains active. In this way, it may happen that the transmitter-receivers of a plurality of doors mounted in parallel with one another remain active concurrently and thus consume power unnecessarily.

Further prior art (U.S. Pat. No. 5,412,297 A) is a closing-edge unit, which monitors a door for proper and obstruction-free closing. According to this prior art there is provided a vibration sensor, which senses the door movement and activates control electronics equipped with a microprocessor and a signal transmitter sufficiently long that it detects the door movement. After being wakened, the transmitter outputs a continuous first "heartbeat" signal. As soon as the closing-edge unit has detected an obstruction, it sends another heartbeat signal, which is different from the first heartbeat signal. If the door controller receives this second heartbeat signal or does not receive either of the two heartbeat signals, either the door movement is stopped or the door movement is reversed, until the door is completely open. The "heartbeat" signal is interrupted, for example, in the event of a defect of the closing-edge unit.

This prior art method has the disadvantage that, for flawless functioning, the vibration sensor must be exposed during the entire door movement to vibrations that are sufficiently strong that it can reliably detect the door movement. In the case of linear movement of a smoothly running door, this conceals the danger that the vibration sensor may misinterpret this condition as a stationary door, causing the first heartbeat signal to be turned off and in turn a malfunction. Certainly this problem could be avoided by using a vibration sensor with very high sensitivity. However, such a sensitive vibration sensor would have the disadvantage that the closing-edge unit would be wakened and fully activated whenever a vibration was sensed, thus causing normal power consumption. If the vibration sensor senses a signal, for example because strong wind is "shaking" the door, the entire electronics are wakened, and so the power consumption of this prior art device is relatively high. Furthermore, this device has the disadvantage that it cannot reliably distinguish whether the door is executing a closing movement or an opening movement. Under some circumstances, this causes the entire electronics to be awake, to transmit its "heartbeat" signal and thus to consume power even during the opening movement, in which monitoring is not necessary for many doors.

The cited disadvantages also apply to the prior art closing-edge unit according to U.S. Pat. No. 7,123,144 B2, since the closing-edge unit described therein also functions only in a manner dependent on detection of a door movement by a motion detector.

Also known from the prior art (US 2006/0028157 A1) is a device that sends out a "check signal" as soon as a pneumatic sensor is tripped by the fact that the door has encountered an obstacle. Stopping and reversing of the door are initiated on the basis of this "check signal", which is received by a door controller.

This prior art device has the disadvantage that it is decidedly unsafe, since the door controller cannot reliably determine whether it is capable at all of receiving the "check signal".

BRIEF SUMMARY OF THE INVENTION

The technical problem underlying the invention is to provide a monitoring method for wireless data exchange between a monitoring device and a stationary unit, which method ensures largely fail-safe operation with short response times, and with which a plurality of doors within a predetermined zone can be operated next to one another without malfunctions and in power-saving manner.

This technical problem is solved by a monitoring method having the features according to claim 1 or 2.

The inventive monitoring method for a motor-driven door, wherein a stationary unit and a monitoring device mounted on the movable door communicate bidirectionally with one another, the monitoring device being supplied with electrical energy by a battery or accumulator or some other mobile power pack and comprising a waking device, a control device, at least one analyzer device and a transmitter/receiver, and wherein data and/or signals of at least one door safety sensor connected to the analyzer device are relayed to the door controller, and wherein the monitoring device is set by the stationary unit into a power-saving idle state, is characterized in that a waking device is automatically wakened cyclically and wakes the control device, which in turn wakes the transmitter/receiver and actively queries a stationary unit assigned individually to it as to whether the monitoring device must remain active or be switched back to the power-saving idle state. For the case that the monitoring device is to remain active, the control device activates the respective safety sensors to be monitored via the at least one analyzer device.

If the monitoring device does not receive any answer from the stationary unit to its active query to the stationary unit, it automatically reverts to the power-saving idle state after expiration of a time-out interval.

By the fact that the monitoring device is automatically wakened cyclically in order to check whether it is receiving an instruction from the stationary unit, the inventive monitoring method has the advantage that the monitoring device is awake only during the brief phase of the active query to the stationary unit, and thus it consumes energy only during this brief phase. Only when the monitoring device receives an instruction to remain awake from the stationary unit does the control device activate the at least one analyzer device, with which the safety sensors are analyzed. The instruction from the stationary unit may contain additional information on which analyzer devices are to be activated. As an example, analyzer devices can be provided for an closing-edge unit or a crash sensor.

In addition, it is provided according to the invention that the stationary unit will transmit an instruction to the monitoring device, to the effect that this must return to the idle state. Hereby it is ensured that the components of the monitoring device are active only as long as is necessary. In this way also, power can be additionally saved.

The inventive method has the further advantage that, because the monitoring device actively queries the stationary unit as to whether it should remain active, the stationary unit communicates only with the monitoring device assigned to it. Other monitoring devices mounted on neighboring doors and also located in the region of the stationary unit are not wakened by the stationary unit, and so no influence is felt by a neighboring monitoring device.

In addition, this method guarantees increased fail-safe capability, because the stationary unit and the monitoring device already notify one another at the beginning of a door movement whether they are functionally ready, and because the wireless radio link between the two components is assured.

Another embodiment of the invention is characterized in that a vibration sensor disposed in or on the monitoring device is connected to the waking device, which wakes the control device as soon as it has detected a door movement by virtue of a vibration. For the case that the vibration sensor is wakened by another external event, such as wind that shakes the door, the monitoring device immediately receives an instruction from the stationary unit to return to the inactive state, whereby the power consumption of such a "false alarm" is considerably reduced. All further features of this second embodiment are identical to the features of the initially described embodiment, in which cyclic waking of the waking device is provided.

This monitoring method has the advantage that the monitoring device is then wakened only when the vibration sensor actually senses a door movement. This embodiment needs very little power, since power has to be supplied only to the vibration sensor and the waking device, which can then wake the other units, such as transmitter/receiver, control device and analyzer device.

According to a particularly preferred embodiment of the invention, a combination of the two monitoring methods can also be provided. In principle, it is possible for the vibration sensor to wake the waking device. In addition, at very long time intervals, the waking device can cyclically wake the control device, so that that this queries the stationary unit, via the transmitter/receiver, as to whether the monitoring device should remain awake. This may be practical if the vibration sensor is too insensitive or defective, at least temporarily, so that, for example, the door can be controlled even without a vibration sensor, or the sensitivity of the vibration sensor can be selectively changed once again.

As an example, a safety sensor connected to the analyzer device can be a safety-edge unit, which is capable of detecting whether the door has encountered an obstruction, and/or it can be a sensor for a wicket in the door and/or it can be a crash sensor, which is capable of detecting whether the door has been knocked out of its guide tracks by a collision with a vehicle, for example, and/or it can be a slack-rope switch and/or any other desired device.

According to a particularly preferred embodiment of the invention, the vibration sensor is simultaneously designed as a crash sensor. This means that the vibration sensor would recognize, during door movement and while the door is stationary, whether the door was being approached so quickly by a fork-lift truck, for example, that the danger exists that the door could be deformed or knocked out of its guide. This means that the vibration sensor, which is present and active in any case, additionally senses a collision of an object with the door. The vibration sensor advantageously signals the collision immediately to the stationary unit, which advantageously relays this information to the door controller.

If the stationary unit is not active and cannot receive the message, the vibration sensor advantageously signals the collision to a buffer device, which conveys the message to the stationary unit as soon as this has become active once again. Hereby it is ensured that the door controller does not transmit an operate instruction to the door when the door is inoperative due to a collision with an object.

In order to rule out any movement of the door after a collision, the door controller advantageously acknowledges the message about the collision via the stationary unit.

According to a further advantageous embodiment, the stationary unit sends the monitoring device an instruction that directs the monitoring device to no longer wake up for a certain time interval, because, for example, the door is moving in opening direction, during which the monitoring device can be inactive, or because another function will prevent door movement for a foreseeable time interval. Hereby further saving of electrical energy is achieved in the monitoring device.

The inventive stationary unit for implementing the method, equipped with a transmitter/receiver disposed in fixed position and communicating bidirectionally with a monitoring device mounted on a movable door, is characterized in a first embodiment by the fact that the stationary unit is designed as a plug-in card, which is inserted into the door controller or into a position encoder for detecting the door position. Preferably the position encoder is one that is already present in any case. As an example, the position encoder may also be a device that detects only a movement of the door or of the door drive.

This embodiment has the advantage that existing door controllers can be retrofitted with the appropriate driver electronics, and so the inventive method is also usable for prior art door controllers. Furthermore, this has the advantage that the stationary unit does not need a separate housing.

According to another advantageous embodiment of the invention, the stationary unit is integrated in the door controller or the position encoder. Hereby costs are saved compared with the retrofitted stationary unit, if the door controller or the position encoder is equipped beforehand for the inventive method.

According to a third embodiment, the stationary unit id disposed at some distance from the door controller or the position encoder, and it communicates with the door controller or the position via a hard-wired interface. In this case, the interface can be designed as at least one digital output and at least one digital input or as a bidirectional data interface. This embodiment has the advantage that, regardless of the mounting location of the fixed door controller or position encoder, the stationary unit can be so disposed that optimal wireless communication with the monitoring device mounted on the door is assured. In addition, this embodiment offers the advantage that the stationary unit can be connected to any desired door controllers and/or position encoders.

The arrangement of the stationary unit in the position encoder or in the vicinity thereof has the advantage that a reliable radio link is always present, because in each case the position encoder is always in the vicinity of the door. A further advantage is that, when the monitoring device wakes up, it queries the stationary unit as to whether the position encoder in communication therewith has sensed a movement of the door. If it has sensed a movement, the stationary unit so informs the monitoring device as soon as this actively sends a query, whereupon the monitoring device remains active. Otherwise it reverts to the power saving idle mode. This embodiment has the further advantage that merely one digital output is sufficient to communicate the information from the monitoring device to any desired door controller.

According to another advantageous configuration of the invention, the position encoder, upon sensing a door movement, queries the door controller as to whether an intended door movement actually exists or as to whether, for example, a movement due to wind-related shaking has been sensed by the position encoder. However, this query is optional.

In principle, it is not necessary for the mobile monitoring device or the stationary unit to query the door controller.

The inventive monitoring device mounted on the door is advantageously equipped with at least one analyzer device, to which there is connected at least one safety sensor, which can be designed, for example, as an safety-edge unit. For this purpose the safety-edge unit is equipped on at least one closing edge of the door with a sensor that transmits a signal when an obstacle is present in the region of the door, so that the door cannot be closed and/or opened.

The safety sensor may also be provided as a sensor for a wicket in the door. If the wicket is not closed, the door is not permitted to open.

The safety sensor can also be designed as what is known as a crash sensor. As an example, if the door is damaged by a vehicle such as a fork-lift truck, the crash sensor responds and transmits an error message.

The safety sensor can also be designed as a slack-rope switch, a reference switch or other device.

According to a particularly preferred embodiment of the invention, the sensors are designed as adaptive or self-learning sensors. For the example of the vibration sensor, the learning operation may be such that the sensor learns, when the door is shaking due to wind, that normally no instruction arrives from the stationary unit during this kind of movement, so that the sensitivity of the vibration sensor to this kind of movement automatically increases. In this case, the waking device no longer wakes the control device upon every detection of a vibration, but does so only if a vibration pattern typical of a door movement was detected by the vibration sensor.

The other described sensors are also designed advantageously as adaptive sensors.

In a further particularly advantageous embodiment of the invention, the safety sensors can be additionally used to wake the waking device. This can be used particularly advantageously to activate the monitoring device, for example if the wicket door is open, or if a crash sensor responds while the door is stationary or no monitoring of the door movement is necessary. As another example, however, this embodiment can also be used for safety strips, which operate pneumatically or have a mechanism of action based on electrical contacts, in order to wake the monitoring device at the latest when the safety sensor has been activated by an obstruction. This would have the advantage of increased operating safety if the devices provided primarily to wake the monitoring device were to fail.

The present invention is not limited exclusively to activation of a door. Other motor driven wickets are also an example of application of the present invention.

In the method in which the waking sensor is wakened cyclically without additional provision of a vibration sensor, the times may be as follows: As an example, the waking sensor is advantageously wakened cyclically by a timer at time intervals of between 100 and 300 ms (milliseconds). Preferably the waking sensor is wakened every 200 ms. If the stationary unit responds, the waking sensor goes to sleep after approximately 10 ms. If the waking sensor does not receive a response from the stationary unit, it checks several times as to whether a response signal will still be received. Without a response signal, it goes to sleep again after approximately 100 ms. In this case the time for cyclic wakening is advantageously increased, for example to five to ten seconds.

In the method in which the waking sensor is wakened primarily by the vibration sensor, it is advantageous for the waking sensor to be additionally wakened automatically every five to ten seconds. In this case the respective cycle is advantageously restarted by a waking event caused by the vibration sensor.

BRIEF DESCRIPTION OF THE DRAWINGS

Further features and advantages of the invention will become evident from the associated drawing, in which an exemplary embodiment of an inventive monitoring device and of the inventive method is illustrated. In the drawing.

DESCRIPTION OF THE PREFERRED EMBODIMENTS

Figure 1:
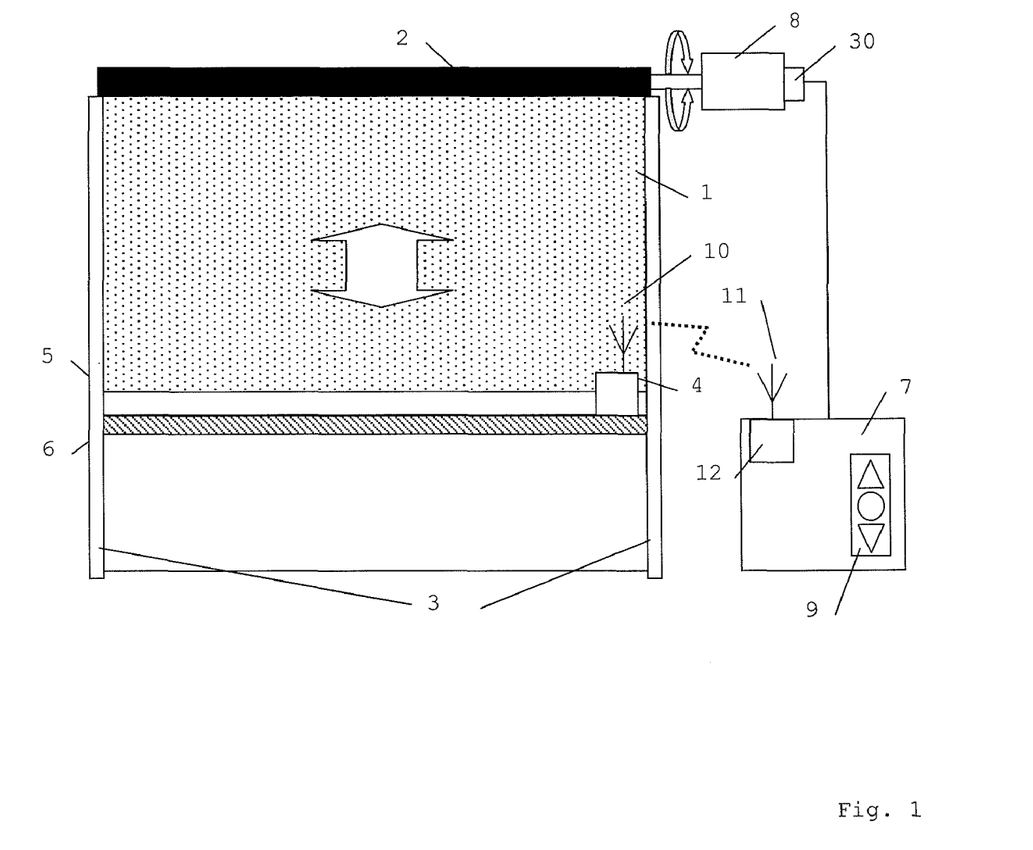
FIG. 1 shows a schematic diagram of a door.

FIG. 1 shows a door 1, which is guided in guide tracks 3 and can be moved via a door shaft 2 with a door drive 8. The illustrated door is a roll-up door, in which door 1 is wound around door shaft 2 during the opening movement. The said door drive 8 is controlled by a door controller 7, which can be commanded by operating elements 9. A position encoder 30 is mounted in or on door drive 8. Door controller 7 additionally contains a stationary unit 12, which can communicate wirelessly via an antenna 11 with a monitoring device 4. On a closing edge of door 1 there is disposed a end bar 5, which imparts stability to door 1. On the closing edge of end bar 5 there is mounted a safety sensor 6, which can be designed, for example, as a photoelectric cell or electrical contact or as a pneumatic switching element.

Also mounted on end bar 5 is monitoring device 4, which has the function of analyzing signals from safety sensors 6. Monitoring device 4 also contains a transmitter/receiver 24 (not illustrated here), which can communicate wirelessly via antenna 10 with door controller 7.

Figure 2:
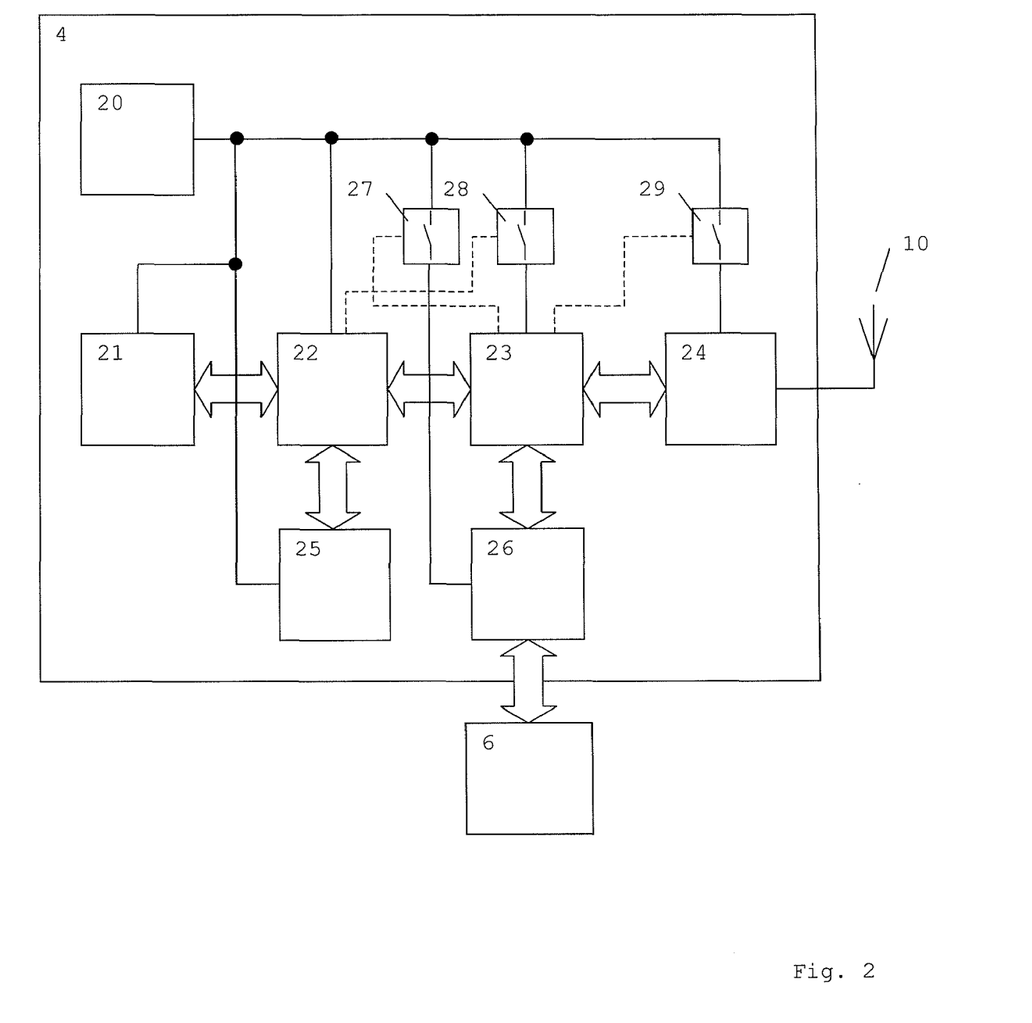
FIG. 2 shows a block diagram of a possible embodiment of the monitoring device.

FIG. 2 shows a block diagram of a possible embodiment of monitoring device 4. In this case a battery 20 functions as the power supply for all electronic components of monitoring device 4. In order that the power consumption of the overall device can be controlled as optimally as possible, individual components can be supplied with electrical energy only as needed, via switches 27, 28, 29.

These electronic components—waking device 22 and/or control device 23 and/or transmitter/receiver 24 and/or timer and/or analyzer device and/or switches 27, 28, 29—of monitoring device 4 can be part of a microprocessor or of another integrated circuit.

As soon as a vibration sensor 21 has detected a door movement, it communicates this to a waking device 22. Furthermore, there is connected to waking device 22 a timer 25, which makes it possible to wake up waking device 22 cyclically. After waking device 22 has established the necessity of a waking operation, it activates, via switch 28, a control device 23, which in turn activates transmitter/receiver 24 via switch 29, in order to query the door controller actively via antenna 10 as to whether it must remain awake.

If a control device 23 receives the instruction from door controller 7 to remain awake and to query safety sensors 6, control device 23 activates, via switch 27, an analyzer device 26, which in turn conditions the signals of safety sensors 6 or if necessary activates these sensors and communicates the information obtained as a result to control device 23.

During this phase, in which monitoring device 4 is activated, continuous data exchange takes place between monitoring device 4 and door controller 7. In the process, information about the status of the safety sensors and the charge condition of battery 20 as well as other diagnostic information about the devices of monitoring device 4 is transmitted to door controller 7, and instructions or operating parameters are sent by door controller 7 to monitoring device 4.

If the door has reached a condition in which monitoring of door 1 by monitoring device 4 is no longer needed, door controller 7 initiates transmission of an instruction to monitoring device 4, whereupon control device 23 can turn off analyzer device 26 and transmitter/receiver 24. In addition, control device 23 transmits the turn-off instruction, which can also contain yet additional information, to waking device 22, which for its part turns off control device 23, until a new event requiring activation of control device 23 occurs.

Figure 3:
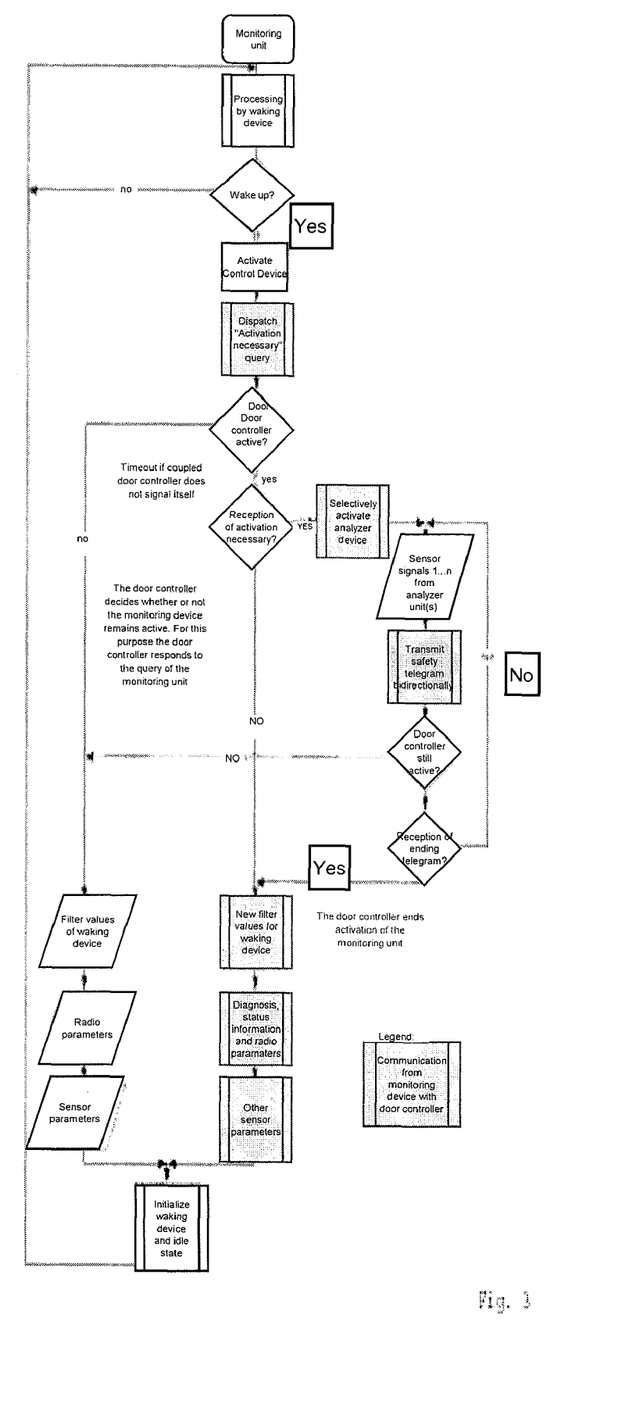
FIG. 3 shows a schematically illustrated sequence of the inventive method in the monitoring device.

FIG. 3 shows the flow diagram of the method executed by monitoring device 4. Monitoring device is equipped with waking device 22. Waking device receives a waking signal from vibration sensor 21, for example, because door 1 has moved or because waking device 22 has been wakened cyclically by timer 25. Once transmitter/receiver 24 has also been activated as a consequence of the waking of control device 23, stationary door controller 7 is queried as to whether the monitoring device should remain active and whether analyzer device 26 should be activated.

If monitoring device 4 does not receive an instruction or a response from the door controller, it proceeds through the optional routines for adaptive adjustment of the sensitivity of the waking sensor for setting the parameters for wireless data transmission, and for setting further adaptive sensor parameters, and reverts to the idle state, in which only the waking device is active.

In contrast, if monitoring device 4 receives an instruction from stationary door controller 7, a test is first executed to determine whether the instruction states that further activation of monitoring device 4 is necessary or whether it should return to the inactive state.

If activation of monitoring device 4 is commanded by door controller 7, analyzer device 26 is selectively activated and the safety sensors are queried. The result of this query is then communicated to door controller 7 in the form of a bidirectional data transmission, which contains, for example, acknowledgment of the data transmission.

If monitoring device 4 establishes in this process that door controller 7 is no longer responding, it returns to the idle state after proceeding through the optional routines for adaptive setting of its parameters.

However, if monitoring device 4 continues to receive instructions from the door controller, it analyzes these and, depending on the instructions either continues to remain active and continues to analyze the safety sensors or it initiates the change of state to the inactive state.

Before the monitoring device switches into the inactive state, it takes over the parameters communicated by door controller 7 in order to adjust the sensitivity of waking device 22 (filter), sends status information to door controller 7 and if necessary accepts further parameters from door controller 7.

Figure 4:
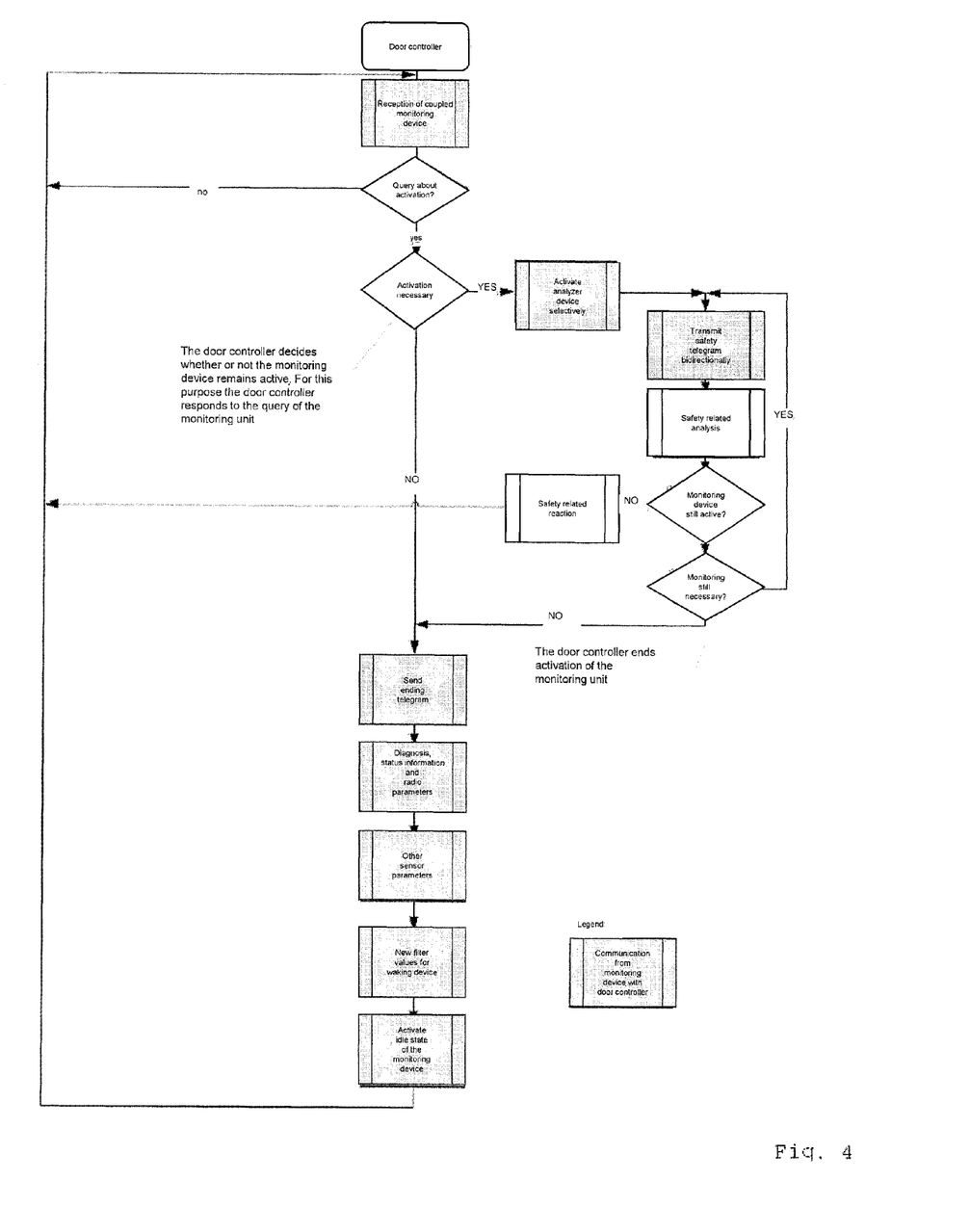
FIG. 4 shows a schematically illustrated sequence of the inventive method in the door controller.

FIG. 4 shows the flow diagram of the method executed by door controller 7.

If door controller 7 has received a message from the monitoring device 4 assigned to it to the effect that monitoring device 4 has been wakened, it checks whether further activation of monitoring device 4 is necessary, and if need be it sends an instruction for selective activation of analyzer unit 26 to monitoring device 4.

Thereafter there begins the bidirectional data communication, in which the state information of the safety sensors are communicated by the monitoring device and subsequently analyzed so that appropriate reactions can be initiated.

Thereafter door controller 7 checks whether the monitoring device should continue to remain active, and it sends the monitoring device the corresponding instructions.

Figure 5:
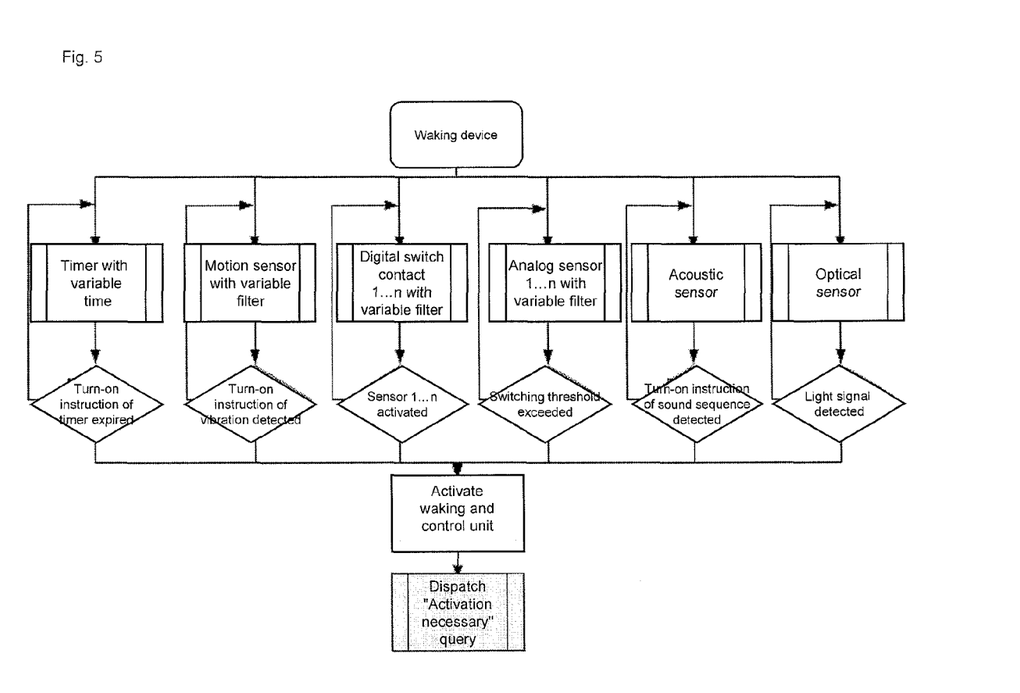
FIG. 5 shows a schematic diagram of possible components and sequences of the processing method of the waking device.

FIG. 5 shows the sequence of the method executed by waking device 22.

REFERENCE NUMERALS

1 Door
2 Door shaft
3 Guide tracks
4 Monitoring device
5 End bar
6 Safety sensor
7 Door controller
8 Door drive
9 Operating element
10, 11 Antenna
12 Stationary unit
20 Battery
21 Vibration sensor
22 Waking device
23 Control device 24 Transmitter/receiver
25 Timer
26 Analyzer device
27, 28, 29 Switches
30 Position encoder

What is claimed is:

1. A monitoring method for a motor-driven door, wherein a stationary unit in communication with a door controller and a monitoring device mounted on the movable door communicate bidirectionally with one another, the monitoring device being supplied with electrical energy by a battery or accumulator or some other mobile power pack and comprising a waking device, a control device, at least one analyzer device and a transmitter/receiver, and wherein data and/or signals of at least one door safety sensor connected to the analyzer device are relayed to the stationary unit, and wherein the monitoring device is set by the stationary unit into a power-saving idle state, characterized in that a vibration sensor wakes the waking device when the vibration sensor detects a vibration caused by a door movement, and in that the waking device wakes the control device, which in turn wakes the transmitter/receiver and actively queries a stationary unit assigned individually to it as to whether the monitoring device must remain active or be switched back to the power-saving idle state.

2. A method according to claim 1, characterized in that, for the case that the monitoring device must remain active, the control device activates the respective safety sensors to be monitored via the at least one analyzer device.

3. A method according to claim 1, characterized in that the waking device is automatically wakened cyclically in addition to the waking operation of the vibration sensor.

4. A method according to claim 1, characterized in that the stationary unit transmits to the waking device the instruction to return to the idle state.

5. A method according to claim 1, characterized in that the vibration sensor additionally senses a collision of an object with the door.

6. A method according to claim 5, characterized in that the vibration sensor immediately signals the collision to the stationary unit.

7. A method according to claim 5, characterized in that the vibration sensor signals the collision to a buffer device, when the stationary unit is unable to accept the message.

8. A method according to claim 5, characterized in that the door controller acknowledges the message about the collision via the stationary unit.

9. A method according to claim 1, characterized in that the vibration sensor automatically learns to distinguish an intentional door movement from an unintentional door movement.

10. A method according to claim 1, characterized in that the waking device, after waking, automatically reverts to the idle state after a predetermined time interval has elapsed without reception of an instruction from the stationary unit.

11. A method according to claim 1, characterized in that the stationary unit is designed as a standalone unit and communicates with the fixed door controller and/or the at least one position encoder via at least one digital input and/or at least one digital output and/or an interface.

12. A method according to claim 1, characterized in that the stationary unit queries a position encoder as to whether the position encoder has detected a door movement.

13. A method according to claim 1, characterized in that the stationary unit queries a door controller as to whether this has initiated a door movement.

\* \* \* \* \*